United States Patent [19]

Lang et al.

[11] 4,094,222

[45] June 13, 1978

[54] ADHESIVELY SECURED ANCHOR BOLT

[75] Inventors: Gusztav Lang, Nüremberg; Wolf Kuhlmann, Munich, both of Germany

[73] Assignee: Hilti Aktiengesellschaft, Schaan, Liechtenstein

[21] Appl. No.: 692,929

[22] Filed: June 4, 1976

[30] Foreign Application Priority Data

Jun. 9, 1975 Germany ............................ 2525579

[51] Int. Cl.² .......................... E04B 1/48; F16B 13/04
[52] U.S. Cl. ........................................ 85/63; 151/41.7
[58] Field of Search .................... 85/63, 23; 151/41.7, 151/14.5; 156/92; 61/45 B

[56] References Cited

U.S. PATENT DOCUMENTS 3,308,585  3/1967  Fischer ................................ 85/63 X

FOREIGN PATENT DOCUMENTS 2,349,659  4/1975  Germany ................................ 85/63
953,056  3/1964  United Kingdom ................ 85/63

Primary Examiner—Ramon S. Britts
Attorney, Agent, or Firm—Toren, McGeady and Stanger

[57] ABSTRACT

An anchor assembly includes an anchor bolt or stud and an adhesive material for securing the bolt in a prepared borehole. The adhesive material consists of at least two required components which, when mixed together, harden to fix the bolt within the borehole. Of the two required components, one is located within a cartridge and the other is placed on the shank of the anchor bolt and can be enclosed within a destructible sheath. By driving the bolt into the cartridge the components are mixed. Either a mixture promoting material can be included in the cartridge or mixture promoting members can be associated with it to assure the component is stripped from the bolt and adequately mixed with the component in the cartridge.

1 Claim, 9 Drawing Figures

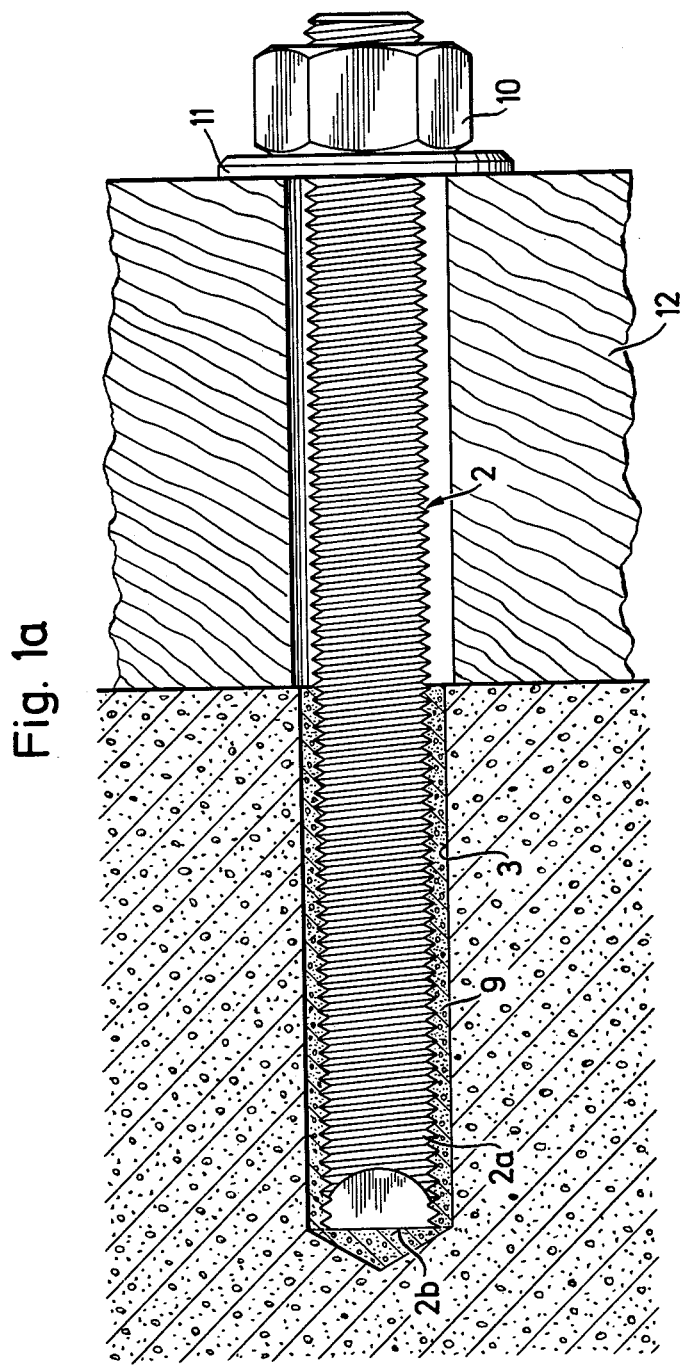

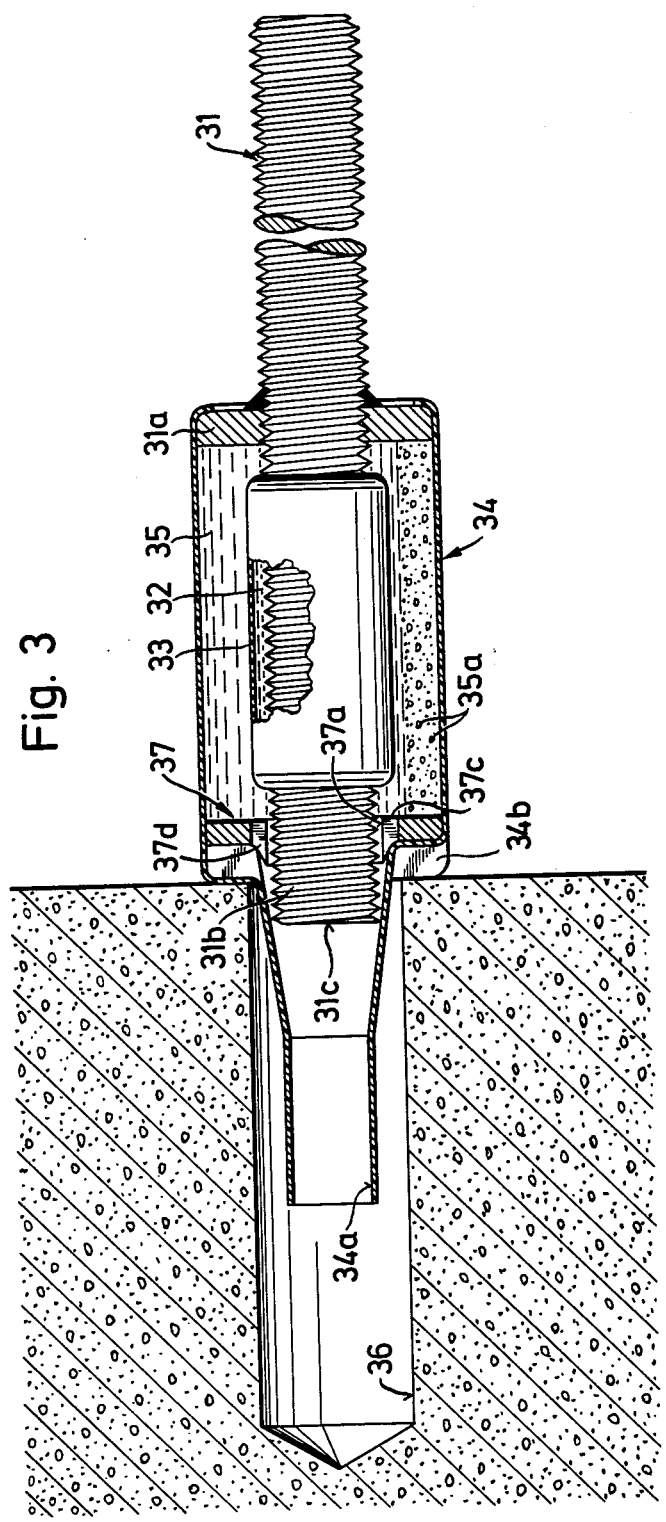

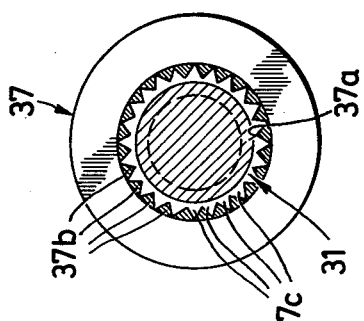
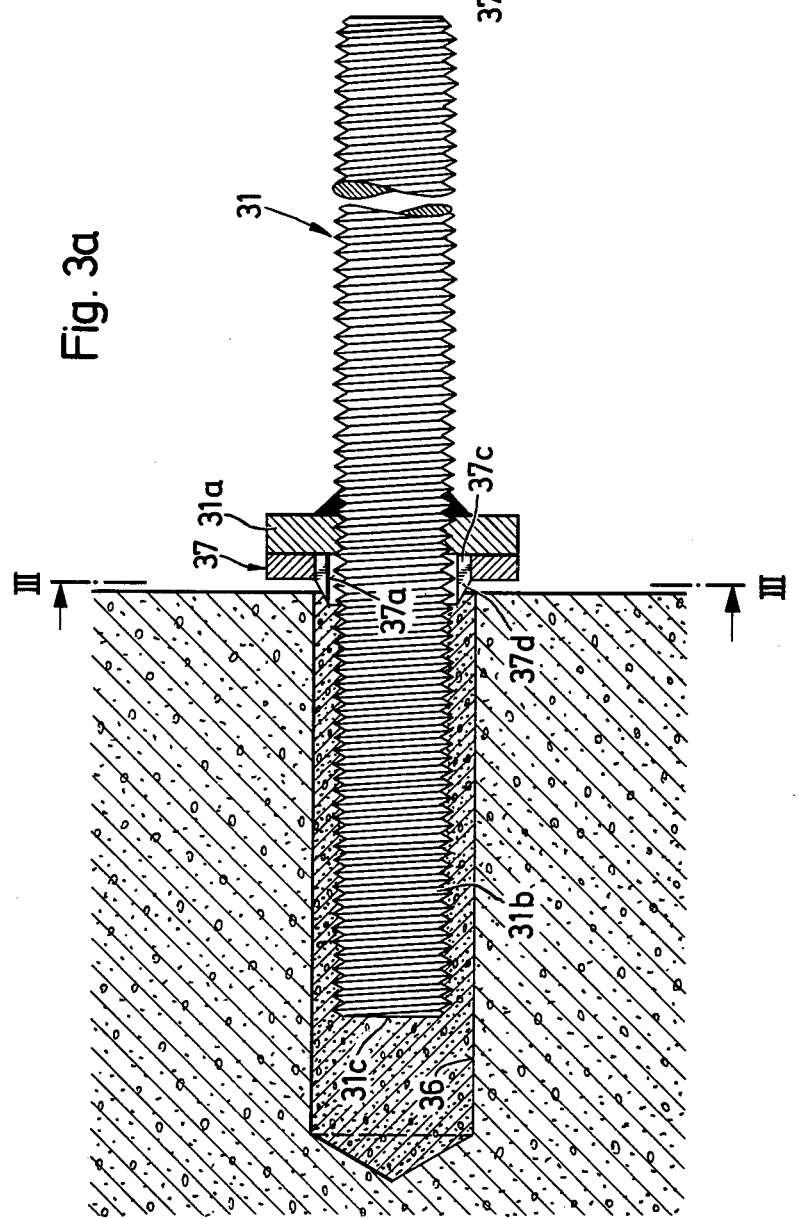

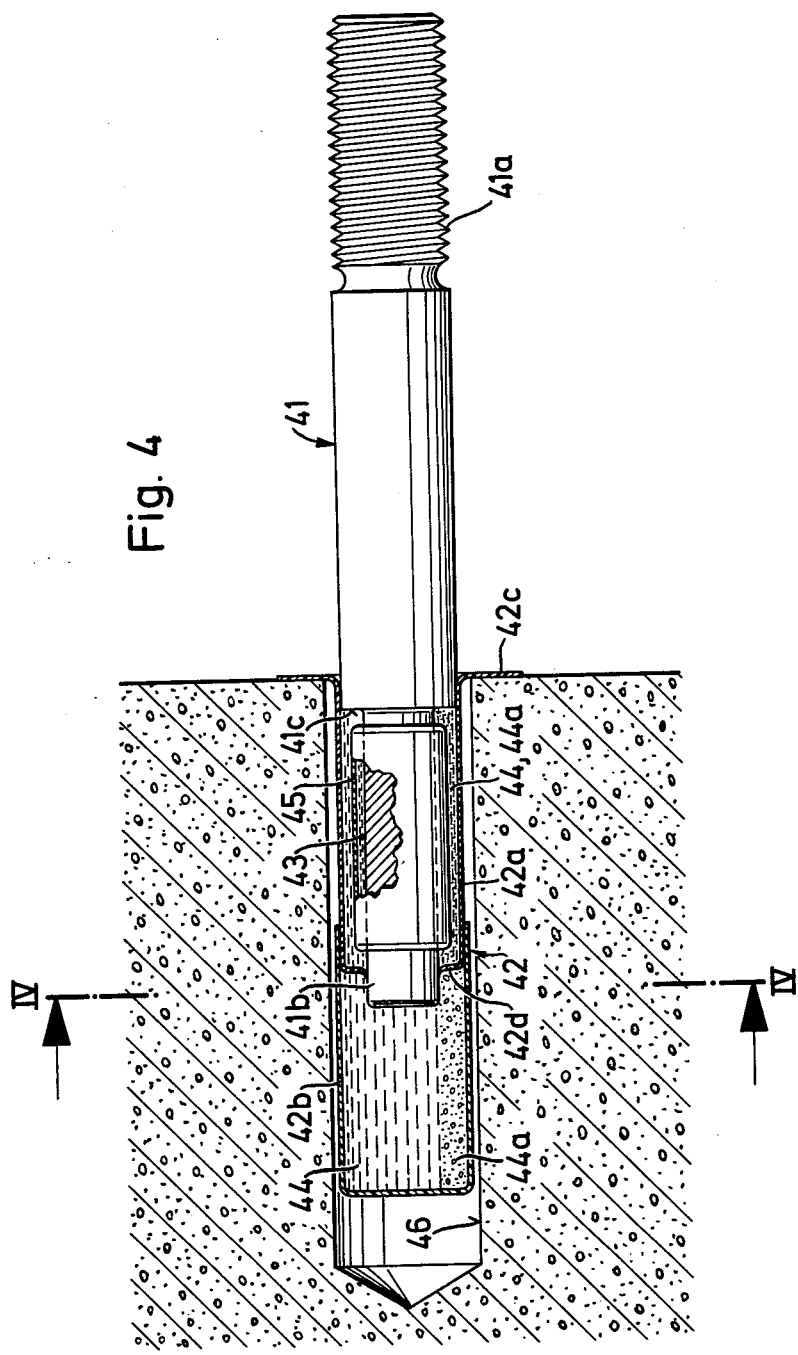

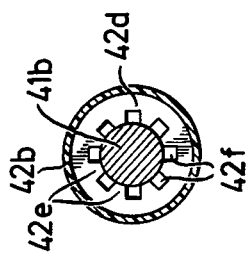
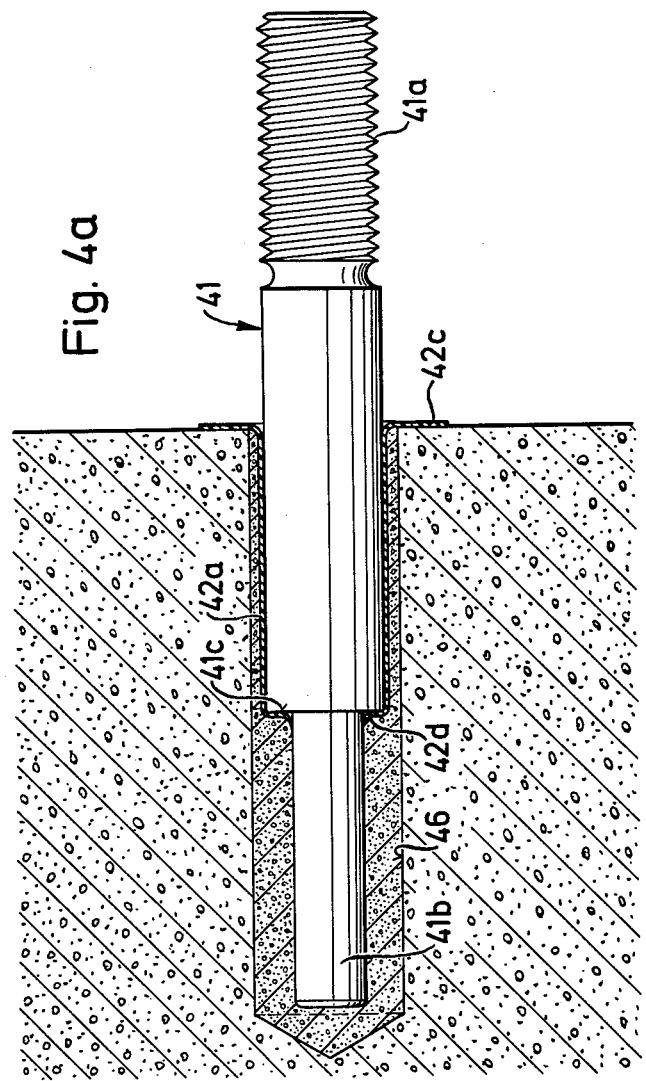

ADHESIVELY SECURED ANCHOR BOLT

SUMMARY OF THE INVENTION

The present invention is directed to an anchor bolt which is secured within a borehole by an adhesive material and, more particularly, it concerns an anchor assembly consisting of an anchor bolt and a cartridge containing at least one of the components of the adhesive material with a portion of another component, preferably the hardening effect producing component, positioned on the shank of the bolt. The cartridge can be formed of a destructible material and a sheath also formed of a destructible material can enclose the adhesive component on the shank of the anchor bolt.

There are known anchor bolts which are secured within boreholes by adhesive material and they consist of an anchor bolt and a cartridge formed of a destructible material with the components of the adhesive material arranged in separate compartments within the cartridge. When the anchor bolt is to be set, the cartridge is inserted into the borehole and is broken for mixing the components by forcing the anchor bolt into the borehole against the cartridge. Due to the destruction of the cartridge, the two adhesive material components, that is, the resin and the hardener, are placed in contact with one another. Mixing the two components initiates the hardening process. Intensive mixing of the components is necessary to ensure complete hardening. In this arrangement, however, it is not possible to view the extent to which the components are mixed. Determining the adequacy of the mixing is strictly subjective, such as by checking the mixing time. Defects can only be determined after the hardening has been completed if an insufficient anchoring value is achieved.

Another problem of this known arrangement is that the anchor bolt must be clean and especially free of grease to ensure a effective bond with the two-component adhesive material. On a construction site it is not always possible to assure that such a condition is met. In another anchor bolt using adhesive material, a supporting part carries the two-component adhesive on the shank of the bolt with at least one of the components being microencapsulated with the microcapsules being thoroughly mixed with the other component. However, microencapsulating is a very complicated and expensive process. Further, since the microcapsules are highly sensitive to impact and pressure, there is the possibility that individual microcapsules will be broken accidently during transportation and handling with at least a partial reaction taking place between the mixed components. If a portion of the adhesive material hardens it is likely to prevent the breaking of the remaining capsules within a borehole when it is attempted to secure the anchor bolt in place.

If the adhesive material contains broken microcapsules there is also the likelihood that the adhesive layer between the borehole wall and the anchor bolt shank will be weakened.

Therefore, it is the primary object of the present invention to provide an anchor assembly which is economical to produce and does not present any problems in its use.

In accordance with the present invention, the anchor assembly consists of an anchor bolt and a cartridge containing at least one of the components of the adhesive material. At least a portion of the other component, required for initiating the hardening process, is deposited on the shank of the anchor bolt.

Such an arrangement has considerable advantages. For instance, the production of the cartridge is considerably simplified, since it need only contain one of the adhesive material components. An advantage to be obtained is that the anchor bolt is protected against contamination in the region enclosed by the other component. In any case, a satisfactory bond of the anchor bolt within a borehole is achieved with the two-component adhesive material separated in this manner. The anchor assembly of the present invention is characterized by an improved storage capacity as compared to known anchor bolts which include microcapsules of the adhesive components. To simplify the application of the adhesive component on the shank of the anchor bolt, it is advantageous if the component includes a polymeric binder. By utilizing the binder, the component can be applied by dipping the shank of the bolt into the binder which has been liquified together with the component. Such a binder provides a certain protection for the component and prevents the detachment of the component from the anchor bolt shank.

In protecting the component on the anchor bolt shank from mechanical damage and chemical influences, it is advisable to enclose the component within a destructible protective sheath. Such a sheath can be formed of glass, paper, aluminum or plastic foil. Such protective sheaths can be applied by pushing them over or shrinking them onto the adhesive material component. Moreover, it is also possible to dip the anchor bolt coated with the component into a liquified material.

On direct contact of the resin and hardener, a protective sheath can be formed at the boundary layer between the two by a local hardening, which prevents further polymerization. It is advantageous, in accordance with the present invention, to combine the cartridge containing at least a portion of the adhesive material, and the anchor rod as a unit with at least a part of the cartridge laterally enclosing that portion of the anchor rod on which the other component of the adhesive material is located. This unitized arrangement is particularly helpful when the anchor assembly is to be used in a wall or ceiling, because a separate cartridge would require some means to prevent it from falling out of the borehole, such as elastic means or the like. By combining the cartridge and anchor bolt in a unit it is also possible to ensure that the necessary mixing ratios is maintained, that is, that the anchor bolt is used with a cartridge which incorporates the requisite amount of adhesive component.

For ejecting one component or the intermixed components from the cartridge, it is advantageous to provide a collar near the rearward end of the anchor bolt which collar has an outer circumferential shape corresponding substantially to the inner cross section of the cartridge. The collar can be provided by an annular disk mounted on and connected to the anchor bolt or it can be formed as an integral part of the bolt. To strip the adhesive component deposited on the shank of the anchor bolt, or if two components are formed on the bolt, it is advantageous if the cartridge includes means for removing the components on the bolt. Further, the stripping action also provides an intensive mixing of the components with one another, even if the bolt is driven axially into the borehole without any rotation.

In one embodiment the cartridge contains filler material which is used for the stripping action. Such filler material can, for example, be quartz sand, steel grit or metal fibers or chips. Of these different filler materials, quartz sand of different grain sizes is particularly suitable to effect the stripping action. Due to the sharp edges of the individual quartz grains, the adhesive component on the anchor bolt is practically completely stripped off the bolt as it is driven into a borehole containing the cartridge and, in addition, the stripped component is mixed with the component contained in the cartridge. Quartz sand is also an inexpensive material and has no harmful effect on the anchoring action. Moreover, the sharpedged quartz sand grains are particularly helpful in mixing the components of the adhesive material.

In another embodiment, the stripping effect is afforded by projections located on the inner wall of a sleeve laterally enclosing the cartridge. The projections can be molded on the wall of a sleeve formed of plastic or they can be produced in a metal sleeve by an inwardly directed stamping action. Further, it is preferable if the sleeve is provided with openings distributed over its axial length so that the adhesive material can flow through the openings into contact with the surface of the borehole. Such openings act as nozzles and ensure an improved mixing of the adhesive material components.

It is advantageous to use bristles extending inwardly from the inner wall of the sleeve surrounding the cartridge for producing the stripping effect. Such bristles are particularly effective in anchor bolts having a thread over their axial length, since the bristles effectively remove the second component within the threads and assure the mixing action with the other component of the adhesive material. The bristles can be formed of steel, plastic or natural bristles.

By using a sleeve extending around the cartridge it is possible to prevent any damage to the surface of the borehole when the anchor assembly is set in a lightweight construction material, such as certain lightweight concrete materials.

In still another embodiment, the stripping action can be provided by a plate located in the cartridge extending transversely of its longitudinal axis and with a central passageway provided in the plate corresponding substantially to the cross section of the bolt. Such a stripping plate is particularly expedient if the second components is enclosed within a protective sheath which must be removed or destroyed when the anchor bolt is driven into a borehole. Such a plate can be inserted loosely into the cartridge and bear against a shoulder or it can be formed integrally with the cartridge.

To obtain a uniform stripping of the component on the bolt it is advisable if the disk-shaped annular plate is provided with teeth or other projections extending inwardly toward its central axis so that individual channels are provided between the teeth or projections. The use of two identically shaped plates turned in opposite directions permits complete stripping with simultaneous division into individual chips. Furthermore, the channels can be disposed radially outwardly toward the outer edge of the plate with the plate completely enclosing the bolt.

To facilitate the handling of such an anchor assembly, it is advantageous if the channels or passageways through the plate open into a common mixing and feeding duct. Such an arrangement is particularly advantageous in boreholes which are very deep relative to their cross section, for the introduction of an adequate amount of the two-component adhesive material.

The mixing and feeding duct can be destroyed as the bolt is driven into the borehole or it can be removed after the completion of the bolt insertion operation.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments.

BRIEF DESCRIPTION OF THE DRAWINGS

In the Drawing:

FIG. 1a is a view similar to FIG. 1, however, the anchor bolt has been completely inserted into the borehole effecting the breakage or destruction of the cartridge;

FIG. 3 is a side view, partly in section, of another embodiment disclosing a unitized anchor assembly in position for inserting the anchor bolt into a borehole;

FIG. 3a is a view similar to FIG. 3, however, the anchor bolt has been completely inserted into the borehole and the cartridge casing removed;

FIG. 3b is a sectional view taken along the line III—III in FIG. 3a;

FIG. 4 is a side view, partly in section, of a unitized anchor assembly embodying the present invention with the cartridge positioned in the borehole and with the anchor bolt ready to be inserted through the cartridge into the hole;

FIG. 4a is a view similar to FIG. 4, however, with the bolt fully inserted into the hole; and FIG. 4b is a sectional view taken along the line IV—IV in FIG. 4.

DETAILED DESCRIPTION OF THE INVENTION

Figure 1:
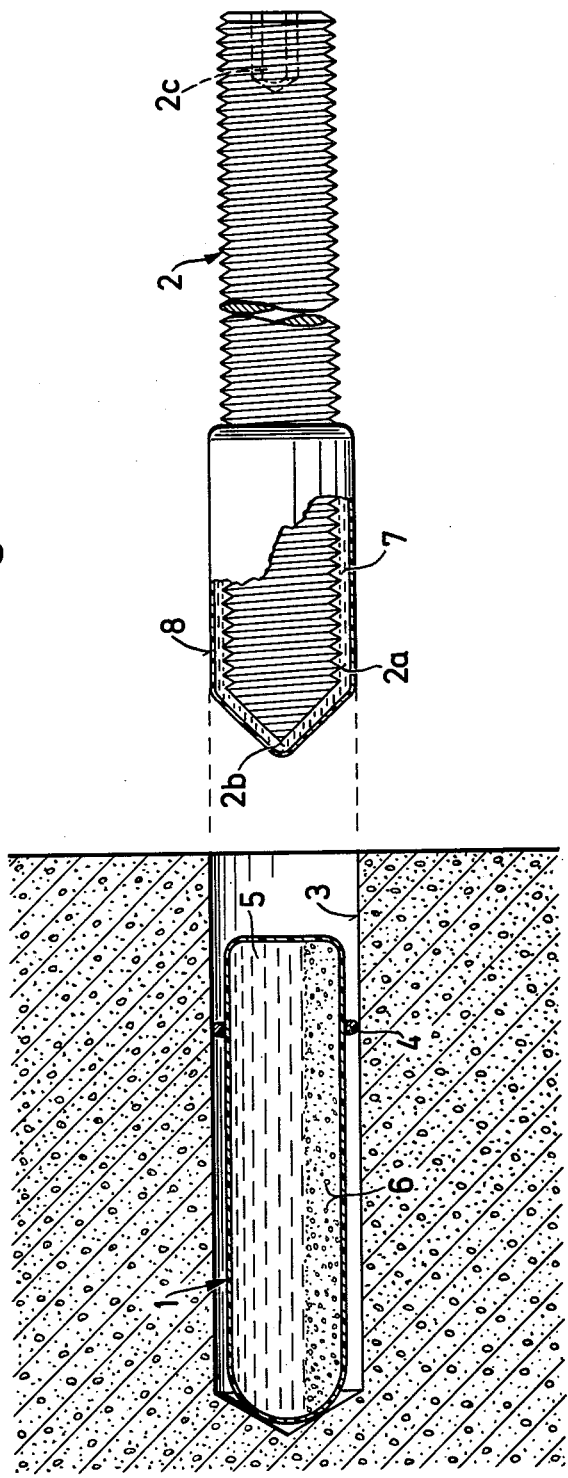
FIG. 1 is a side view, partly in section, illustrating an anchor assembly with a cartridge containing an adhesive material inserted into a borehole and with an anchor bolt aligned for insertion into the hole.

In FIG. 1 an anchor assembly is shown consisting of a cartridge 1 and an anchor bolt 2. The cartridge housing or casing is formed of a destructible material, such as glass, plastic or the like, and is shown inserted into a prepared borehole 3. An elastic ring 4 is provided about the outer surface of the cartridge 1 for securing it in the borehole 3 against displacement. The cartridge 1 contains one component of a two-component adhesive material, preferably a resin 5, as well as a filler material 6 mainly of a mineral composition, such as quartz sand of different grain sizes. However, metallic filler material, for example, steel grit, metal fibers or chips, can also be used. The anchor bolt 2 is an axially extending member having a portion of its front part 2a enclosed by the other component of the two-component adhesive material and, preferably, by a hardener 7. As is known, a two-component adhesive hardens when the two components, the resin 5 and the hardener are mixed together. As long as the components are maintained separate from one another the hardening action does not take place. The component or hardener 7 can be applied to the shank of the anchor bolt 2 in pure form or in a mixture preferably with a polymeric binder. To protect the hardener 7 and the binder, if any is used, against mechanical damages or chemical attack, and also against the action of ultraviolet rays, a protective sheath 8 formed of a destructible material is provided over the deposit on the shank. Such a protective sheath can be formed of glass, paper, aluminum or plastic foil so that it will be ruptured or destroyed by the broken fragments of the cartridge 1 as the bolt is driven into the borehole. In addition, the filler material 6 will also aid in breaking the protective sheath. To break up the cartridge 1, a cutting edge 2b is provided at the front or leading end of the anchor bolt 2, that is the end which is first inserted into the borehole. At its opposite or trailing end, the bolt 2 has a hexagonal recess 2c into which a member can be inserted for effecting the rotation of the bolt. In FIG. 1a, the anchor bolt 2 has been driven into the borehole, rupturing the cartridge 1 so that the two components of the adhesive material are mixed together. As compared to FIG. 1, in FIG. 1a the bolt 2 is turned 90° showing one of the faces of the cutting edge 2b. As a result of the destruction of the cartridge 1 when the bolt 2 is driven in, the contents of the cartridge, that is, the resin 5 and the filler 6 are mixed together with the hardener 7 stripped from the surface of the bolt 2, forming an adhesive sheath 9 laterally disposed around the front part of the bolt within the borehole. Further, a beam 12 is shown attached to the structure containing the borehole, by means of a nut 10 and a washer 11 positioned on the outer end of the bolt.

Figure 2:
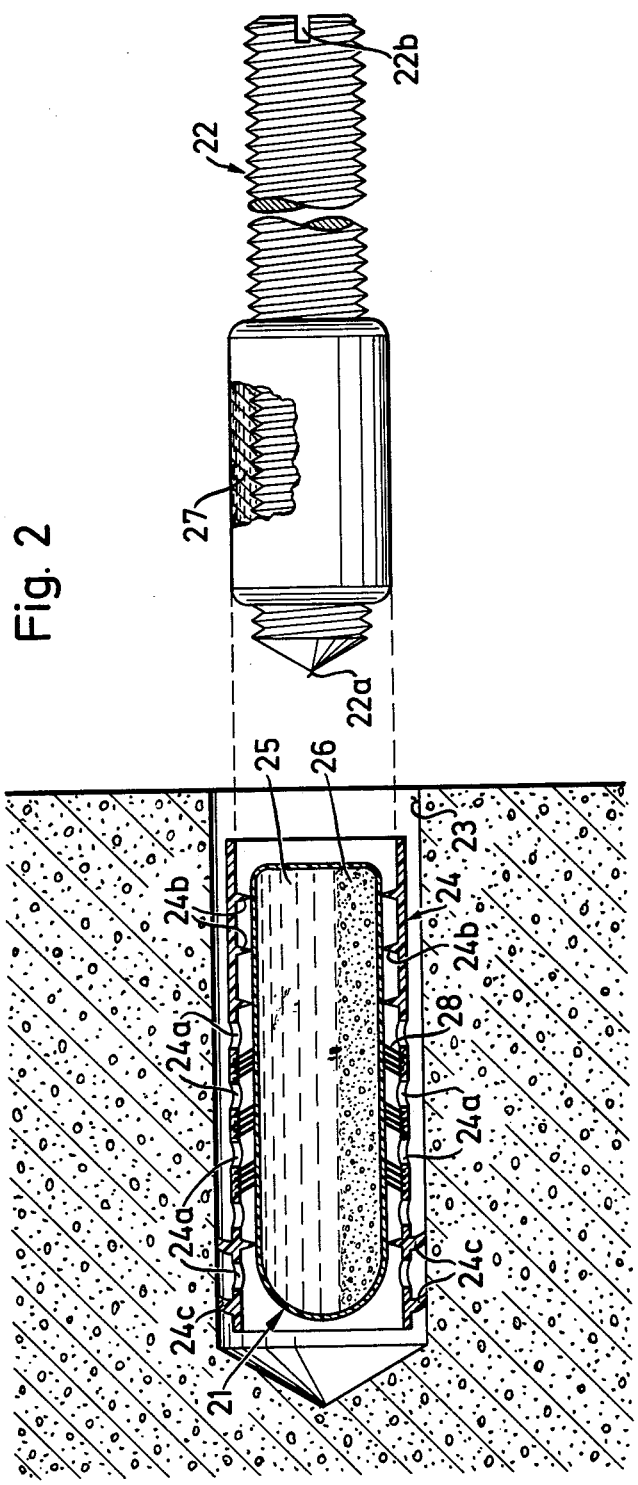
FIG. 2 is a view similar to FIG. 1 illustrating another embodiment of the anchor assembly with a sleeve laterally enclosing the cartridge within the borehole for effecting a stripping and mixing action.

In FIG. 2, another anchor assembly is shown embodying the present invention and it consists of a cartridge 21 and an anchor bolt 22. The cartridge is located within a borehole 23 and is enclosed for its axial length by a sleeve 24. Sleeve 24 is spaced radially outwardly from the outer surface of the cartridge 22 and a plurality of openings 24a are provided through the sleeve over a major portion of its length.

Radially inwardly directed projections 24b are formed on the inner surface of the sleeve and serve as stripping means for removing the component or hardener 27 deposited on the shank of the anchor bolt 22. At its leading end, that is the end directed into the borehole as illustrated in FIG. 2, the bolt 22 has a point 22a and the opposite or trailing end is provided with a slot 22b into which a member can be engaged for rotating the tie rod about its axis. As with the cartridge shown in FIG. 1, the cartridge 21 contains one adhesive material component, that is resin 25 as well as filler material of a mineral or other composition, for example, quartz sand 26.

As shown in FIG. 2, in addition to the projections 24b, inwardly directed bristles 28 are also formed on the inner surface of the sleeve 24, with the bristles extending radially or radially obliquely inwardly toward the cartridge. While the bristles are shown in combination with the projections, they could be used in place of the projections. The sleeve laterally enclosing the cartridge can prevent any damage to the wall of the borehole 23 when the anchor assembly is inserted into a light-weight construction material, such as gas concrete. On its outer surface, particularly at the leading end first inserted into the borehole, the sleeve is provided with outwardly projecting claws 24c which not only effect the cleaning of the wall of the borehole 23 but also afford a preliminary positioning of the sleeve and cartridge within the borehole.

In FIG. 3 a unitary anchor assembly is disclosed with the anchor bolt and cartridge combined so that the bolt can be positioned at the entrance to a borehole ready to be driven in. The unitary assembly includes an anchor bolt 31 having an annular disk-shaped collar 31a secured to the bolt at a point positioned between its ends. Forwardly of the collar 31a, on the front portion 31b, of the shank of the bolt there is deposited one component of a two-component adhesive material, preferably a hardener 32. Surrounding the hardener 32 is a protective sheath 33. The full axial length of the front part 31b of the bolt, including the collar 31a, is arranged within the casing 34.

In addition to containing the other component of the adhesive material, preferably a resin 35, the cartridge or casing 34 can also contain a filler material, if it is necessary, and such filler material can be quartz sand, steel grit or a similar substance. The casing has a substantially cylindrical form. At its forward end shown extending into the borehole 36, the casing has a mixing and feeding duct 34a which tapers inwardly in the portion projecting forwardly from the leading end 31c of the bolt 31. As can be seen in FIG. 3, the leading end 31c of the bolt forms a closure for the tapered inner surface of the mixing and feeding duct and ensures against any premature outflow of the adhesive material from the casing 34. At the end of the mixing and feeding duct 34a connected to the casing 34, vents 34b are provided which permit the escape of air from the borehole 36 as it is filled with the adhesive material. Furthermore, within the forward end of the casing 34, immediately rearward of the duct 34a, there is a stripping plate 37 of disk-shaped annular configuration which fits around the front end of the shank of the bolt 31 forwardly of the front end of the sheath 33 enclosing the hardener 32. As can be seen in FIG. 3b, the plate 37 has a centrally arranged opening 37a which corresponds in cross sectional areas substantially to that of the cross section of the bolt 31. When the bolt 31 is driven into the borehole, either as a result of a hammering action which provides an axial movement or the combination of a hammering action and a rotational action which provides both an axial and a rotational movement, the opening through the duct 34a is increased by the leading end 31c of the bolt. As the bolt moves into the borehole the collar 31a starts to eject the resin 35 and the filler material 35a through the opening in the stripping plate 37. After a small axial movement into the borehole, the stripping plate commences to remove the hardener component 32 from the front part 31b of the bolt and initiates the mixing action between the hardener and the resin 35 and filler material 35a located in the casing 34. The relative movement between the bolt 31 and the stripping plate 37 causes the protective sheath 33 to be ruptured or destroyed releasing the hardener component 32. As the resin and hardener components mix they are forced out of the casing 34 by the collar 31a mounted on the bolt as it moves inwardly toward the borehole. The mixed adhesive material flows through the gap or channels 37c formed by the combination of the inner periphery of the stripping plate 37 and the surface of the anchor bolt 31. Forwardly of the stripping plate, the adhesive material mixture is pressed forwardly and guided through the mixing and feeding duct 34a into the borehole. As the bolt is driven into the borehole, the mixing and feeding duct 34a is, for the most part, destroyed by the mechanical stresses generated.

In FIG. 3a the front part 31b of the bolt is shown inserted into the borehole 36 with the adhesive material filling the space between the surface of the borehole and the surface of the front part of the bolt. The portion of the casing 34 located outwardly of the borehole 36 must be removed when the action of inserting the bolt into the hole has been completed. To facilitate its removal, the casing 34 has a preset breaking point in the range of the vents 34b. However, the stripping plate 37 remains on the bolt 31 and forms a stop for the collar 31a and ensures, together with the collar, a seat at the opening from the borehole for the bolt. For centering the bolt as it is inserted into the borehole, the stripping plate 37 has an annular shoulder 37d which guides the bolt centrally into the opening to the borehole. Any excess adhesive material is displaced from the borehole 36 by bolt 31 and the stripping plate 37 contributes to an improved optical appearance of the anchor assembly.

In FIG. 3b the stripping plate is shown with the view taken along the line III—III in FIG. 3a. As mentioned above, the passageway 37a through the plate corresponds to the cross sectional shape of the bolt 31. Further, triangular shaped teeth 37b line the opening through the plate with the apices of the teeth directed inwardly toward the bolt. The resin-hardener adhesive mixture from within the casing 34 is extruded through the channels 37c formed between the teeth and the surface of the bolt.

In FIG. 4 another embodiment of the invention is illustrated in which the bolt 41 and cartridge 42 are combined as a unit. The bolt 41 has a threaded portion 41a extending forwardly from its trailing end. Forwardly of the threaded part 41a, the bolt has a smooth exterior surface which has a diameter that corresponds approximately to the diameter of the inside surface of the cartridge 42. Ahead of the smooth portion of the bolt 41 is a reduced diameter portion 41b which extends to the leading of the bolt. The portion of the bolt 41b is centrally arranged relative to the larger diameter part located rearwardly from it so that an annular collar 41c is located on the forward end of the smooth portion of the bolt laterally surrounding the trailing end of the reduced diameter portion 41b. The reduced diameter portion 41b is surrounded by one of the components of the adhesive material, preferably the hardener 43. The cartridge 42 consists of two telescopic parts, a sleeve 42a laterally enclosing the major portion of the reduced diameter portion 41b rearwardly of its leading end and a cap 42b secured to the forward end of the sleeve 42a and extending forwardly from it in the axial direction of the bolt. The rearward end of the sleeve 42a contacts the front end of the smooth portion of the bolt and then is bent outwardly forming a flange 42c which serves as an axial stop support against the surface of the material into which the borehole is drilled. The front end of sleeve 42a is bent inwardly into contact with the surface of the reduced diameter portion 41b of the bolt. The sleeve 42a and the forwardly extending cap 42b contain one component of the multi-component adhesive material, for example, the resin 44 as well as filler material 45, preferably in a fine-grained form. While the filler material 44a is shown within both the sleeve and the cap, it could be held within only one of the two enclosing members. To prevent a premature reaction between the hardener 43 deposited on the reduced diameter portion 41b of the shank and the enclosing resin 44 within the sleeve, a protective sheath 45 is provided over the hardener so that the two components are maintained separate. The front end of sleeve 42a bent inwardly toward the reduced diameter portion 41b provides a stripping plate 42d laterally enclosing the reduced diameter portion. The stripping plate 42d removes the hardener component from the reduced diameter portion 41b of the shank when the bolt 41 is driven into the borehole.

In FIG. 4a the anchor bolt 41 is shown displaced from the position in FIG. 4 and is fully inserted into the borehole. With the bolt fully inserted, the collar 41c at the trailing end of the reduced diameter portion 41b rests against the stripping plate 42d which serves as a stop. Due to the pressure generated as the bolt is inserted, cap 42b is separated from the forward end of the sleeve 42a and the adhesive material mixture can enter into the borehole and surround the bolt. Preferably, cap 42b is made of an easily destructible material, such as glass, which shatters when the bolt is driven in. Alternatively, cap 42b can be perforated with the perforations sealed by means of a thin film, preferable a polyamide film. The film is displaced by the action of the bolt being driven into the borehole. Moreover, cap 42b serves to protect the surface of the borehole when the anchor assembly is set into a light-weight construction material, such as a gas concrete. Flange 42c on the rearward end of the sleeve 42a prevents any accidental outflow of the adhesive from the borehole. However, due to its elastic design, the flange permits any excessive adhesive material to flow out of the borehole and avoids any resultant pressure build up. Furthermore, sleeve 42a serves along with its flange 42c as a centering member for the anchor bolt in borehole 46 and also improves the appearance of the bolt after it has been set.

FIG. 4b illustrates the section through the bolt taken along the line IV—IV in FIG. 4. Stripping plate 42b surrounds the reduced diameter portion 41b of the bolt shank and projections or teeth 42e extend inwardly into contact with the surface of the bolt. The projections 42e are spaced apart providing openings or channels 42f through the stripping plate between adjacent projections. The openings 42f permit the resin 44 within the sleeve 42a to flow in the forward direction into the borehole. As the bolt is driven in, the projections effect a stripping action, removing the hardener 43 from the surface of the bolt for mixture with the resin component 44 so that the mixed components flow through the openings 42f. Further, the openings 42f can be displaced radially outwardly from the positions shown in FIG. 4b, with the inner periphery of the stripping plate 42d enclosing the reduced diameter portion 41b of the shank so that it is in continuous contact with the shank surface. This arrangement results in a complete stripping of the hardener, and also in a better mixing of the resin 44 with the hardener 43 and with the filler material if any is used.

While specific embodiments of the invention have been shown and described in detail to illustrate the application of the inventive principles, it will be understood that the invention may be embodied otherwise without departing from such principles.

What is claimed is:

1. An anchor assembly comprising an anchor bolt and an adhesive material for securing the anchor bolt in a prepared borehole, the adhesive material comprising at least a first component and a second component with one of said components effecting the hardening action when they are mixed together, a cartridge containing one of said first and second components, said cartridge formed of a destructible material, wherein the improvement comprises that said anchor bolt has an axially extending shank, at least a portion of the other one of said first and second components disposed on said shank, a destructible protective sheath enclosing said at least one portion of the other one of said first and second components deposited on said shank, said shank having a first end arranged to be inserted first into the prepared borehole and an oppositely directed second end, a collar formed on said shank intermediate the first and second ends thereof, said collar extending radially outwardly from said shank transversely of the axial direction thereof, said cartridge having an inner surface spaced outwardly from said shank and the outer circumferential periphery of said collar disposed in continuous contact with the inner surface of said cartridge, said shank has a first portion extending from the first end of said shank toward the second end thereof to a point intermediate the ends of said shank and a second portion extending from the end of said first portion intermediate the ends of said shank toward the second end of said shank, said first and second portions being co-axial and said second portion having a larger diameter than said first portion, said collar being formed on the end of said second portion connected to said first portion said protective sheath located on said first portion of said shank, said cartridge laterally enclosing said first portion of said shank and extending in the axial direction of said shank from the first end of said shank away from the second end thereof, a stripping plate mounted on the first portion of said shank adjacent the first end thereof and extending transversely of the axial direction of said shank, said cartridge comprising a cap laterally enclosing said stripping plate and extending in the axial direction of said shank from the first end of said shank away from the second end thereof, and a sleeve secured to said stripping plate radially outwardly from the said first portion and laterally enclosing said first portion of said shank and fitted closely about the end of the second portion of said shank adjacent to said first portion, and the opposite end of said sleeve from said stripping plate having a radially outwardly directed flange extending transversely of the axis of said shank and said flange arranged to extend outwardly beyond the diameter of the prepared borehole into which the anchor assembly is inserted.

* * * * *